United States Patent
Kazak et al.

(10) Patent No.: US 10,628,189 B2
(45) Date of Patent: Apr. 21, 2020

(54) SYNCHRONOUS OPERATION METHOD PERFORMANCE IN CONTEXT OF ASYNCHRONOUS EVENT LOOP

(71) Applicant: ENTIT Software LLC, Sunnyvale, CA (US)

(72) Inventors: Yafim Kazak, Yehud (IL); Boris Kozorovitzky, Yehud (IL); Marina Gofman, Yehud (IL); Gil Kedem, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/959,600

(22) Filed: Apr. 23, 2018

(65) Prior Publication Data
US 2019/0324783 A1 Oct. 24, 2019

(51) Int. Cl.
*G06F 9/455* (2018.01)
*G06F 9/54* (2006.01)
*G06F 9/52* (2006.01)

(52) U.S. Cl.
CPC ............ *G06F 9/45525* (2013.01); *G06F 9/52* (2013.01); *G06F 9/542* (2013.01)

(58) Field of Classification Search
CPC ........ G06F 9/45525; G06F 9/44; G06F 9/455; G06F 9/45504; G06F 9/45516; G06F 9/4806; G06F 9/52; G06F 9/522; G06F 9/542
USPC .......................................... 717/159; 719/318
See application file for complete search history.

(56) References Cited

U.S. PATENT DOCUMENTS

| | | | | |
|---|---|---|---|---|
| 5,237,684 A | * | 8/1993 | Record | G06F 11/3466 714/E11.2 |
| 5,838,969 A | * | 11/1998 | Jacklin | G06F 9/542 719/318 |
| 6,173,337 B1 | * | 1/2001 | Akhond | G06F 9/542 719/318 |
| 9,262,156 B2 | | 2/2016 | Dvinsky et al. | |

(Continued)

FOREIGN PATENT DOCUMENTS

| CN | 107562427 | 1/2018 |
|---|---|---|
| EP | 3223155 | 9/2017 |

OTHER PUBLICATIONS

Tilkov et al. "Node.js" Using JavaScript to Build High-Performance Network Programs, 2010, IEEE, pp. 80-83, (Year: 2010).*

(Continued)

*Primary Examiner* — Jason D Mitchell (57) ABSTRACT

A synchronous operation method receives a call request from program code executing on an execution engine. The program code has an associated event loop handling asynchronous event calls and callbacks within the program code. Handlers of the event loop associated with the asynchronous event calls and the callbacks within the program code, except a handler of the event loop associated with the synchronous operation method, are temporarily disabled. The synchronous operation method performs an operation specified within the call request, while the event loop is running with the handlers in question temporarily disabled. The synchronous operation method, upon completion, calls back its handler with results of performance of the operation, and the disabled handlers are reenabled.

17 Claims, 4 Drawing Sheets

(56) References Cited

U.S. PATENT DOCUMENTS

| | | | | |
|---|---|---|---|---|
| 2002/0015064 | A1* | 2/2002 | Robotham | G06F 3/0481 |
| | | | | 715/863 |
| 2002/0166000 | A1* | 11/2002 | Rossi | G06F 8/38 |
| | | | | 719/328 |
| 2010/0241732 | A1* | 9/2010 | del Valle Lopez | G06F 3/038 |
| | | | | 709/219 |
| 2014/0337864 | A1* | 11/2014 | Zhang | G06F 9/542 |
| | | | | 719/318 |
| 2016/0373798 | A1 | 12/2016 | Borgogno | |
| 2017/0371703 | A1 | 12/2017 | Wagner et al. | |
| 2018/0210714 | A1* | 7/2018 | Grigoryan | G06F 8/36 |
| 2018/0300197 | A1* | 10/2018 | Marron | G06F 11/079 |

OTHER PUBLICATIONS

Anonymous "An Introduction to libuv" as archived by the web archive project on Dec. 28, 2017 <https://web.archive.org/web/20171225183317/https://nikhilm.github.io/uvbook/basics.html> (Year: 2017).*

Wamboldt, "Asynchronous JavaScript with Callbacks", online < https://brandonwamboldt.ca/asynchronous-javascript-with-callbacks-1769/ >, May 15, 2016, 11 pp.

"Having your Node.js Cake and Eating It Too", online < https://medium.com/the-node-js-collection/having-your-node-js-cake-and-eating-it-too-799e90d40186 >, Aug. 10, 2017, 9 pp.

"How (not) to Access V8 Memory from a Node.Js C++ Addon's Worker Thread", online < https://nodeaddons.com/how-not-to-access-node-js-from-c-worker-threads/ >, Feb. 1, 2016, 13 pp.

Chandrayan, "How Node.Js Single Thread Mechanism Work? Understanding Event Loop in NodeJs", Nov. 25, 2017, 9 pp.

* cited by examiner

SYNCHRONOUS OPERATION METHOD PERFORMANCE IN CONTEXT OF ASYNCHRONOUS EVENT LOOP

BACKGROUND

A computer programming language is a formal language that specifies a set of instructions for a computing device that can be used to create computer programs that the device executes to perform desired tasks. In the context of a client-server environment, such as a client computing device running a web browsing program that accesses a web site over the Internet that is hosted by a server computing device, program code may be executed at the client (i.e., "client-side" execution), or at the server (i.e., "server-side" execution). An example of a programming language is JavaScript. JavaScript code traditionally has been client-side executed, but runtime environments like the Node.js runtime environment has enabled JavaScript code to be server-side executed.

A computing device typically executes the program code of a computer program in a synchronous manner, but may also execute the code asynchronously. For example, if there is a first operation followed by a second operation within the program code, synchronous execution means that the second operation is not executed until execution of the first operation has been completed. By comparison, in asynchronous operation, once execution of the first operation has been initiated, execution of the second operation is initiated, even if the first operation has not been completely executed. The Node.js runtime environment defaults to asynchronous execution, using a single-threaded event-driven programming model.

DETAILED DESCRIPTION

As noted in the background section, the Node.js runtime environment provides for server-side execution of JavaScript code primarily in an asynchronous manner. The Node.js framework utilizes a JavaScript execution engine, such as the V8 JavaScript execution engine, to compile JavaScript code to native machine code instead of interpreting the code in real-time. The Node.js framework can also leverage an abstraction layer, such as the libuv abstraction layer, to support asynchronous network and input/output (I/O) operations using event loops. The asynchronous, or non-blocking, nature of JavaScript execution within the Node.js environment is one reason why the Node.js framework permits a server computing device to execute application written in JavaScript so as to easily support, in a highly performant manner, a large number of concurrent connections from client computing devices. The single-threaded event-driven programming model of the Node.js framework means in this respect that the framework avoids the performance costs associated with context switching that are incurred in a multithreaded model.

Although the Node.js environment is primarily an asynchronous program code execution environment, there are cases in which synchronous, or blocking, execution of operations may have to occur. This may occur in the context of networking and other I/O operations, in which a data-reading operation, for example, may have to be completed before the next operation, which may use the read data, can be executed. Such an operation is called a blocking operation, because the operation blocks execution of following operations until it has been completed. By comparison, a non-blocking operation does not block further execution of program code: once execution of a non-blocking operation has been initiated, the next operation can have its execution initiated without having to wait for completion of the non-blocking operation.

Some techniques to lend synchronous execution of operations within the Node.js environment may suffer from various shortcomings, such as the inefficient use of computing device resources that may result in performance degradation. For example, synchronous operation execution may be achieved via employing additional threads, even though this technique is contraindicated by the single-threaded model underlying the Node.js framework and thus lessens the advantages originating from the model. Some techniques may for networking I/O operations open additional connections to the resources specified within the operations, which also represents inefficient computing device resource usage.

Techniques described herein provide for synchronous (i.e., blocking) program code operation execution within a server-side, single-threaded framework that employs an event-driven event loop without inefficient usage of computing device resources. More specifically, the techniques described herein provide for blocking JavaScript program code operation execution within a Node.js framework that employs a libuv library event loop, without employing additional threads or opening additional connections to operation-specified resources. The JavaScript program code may be executed using an existing JavaScript execution engine, such as the V8 JavaScript execution engine.

Figure 1:
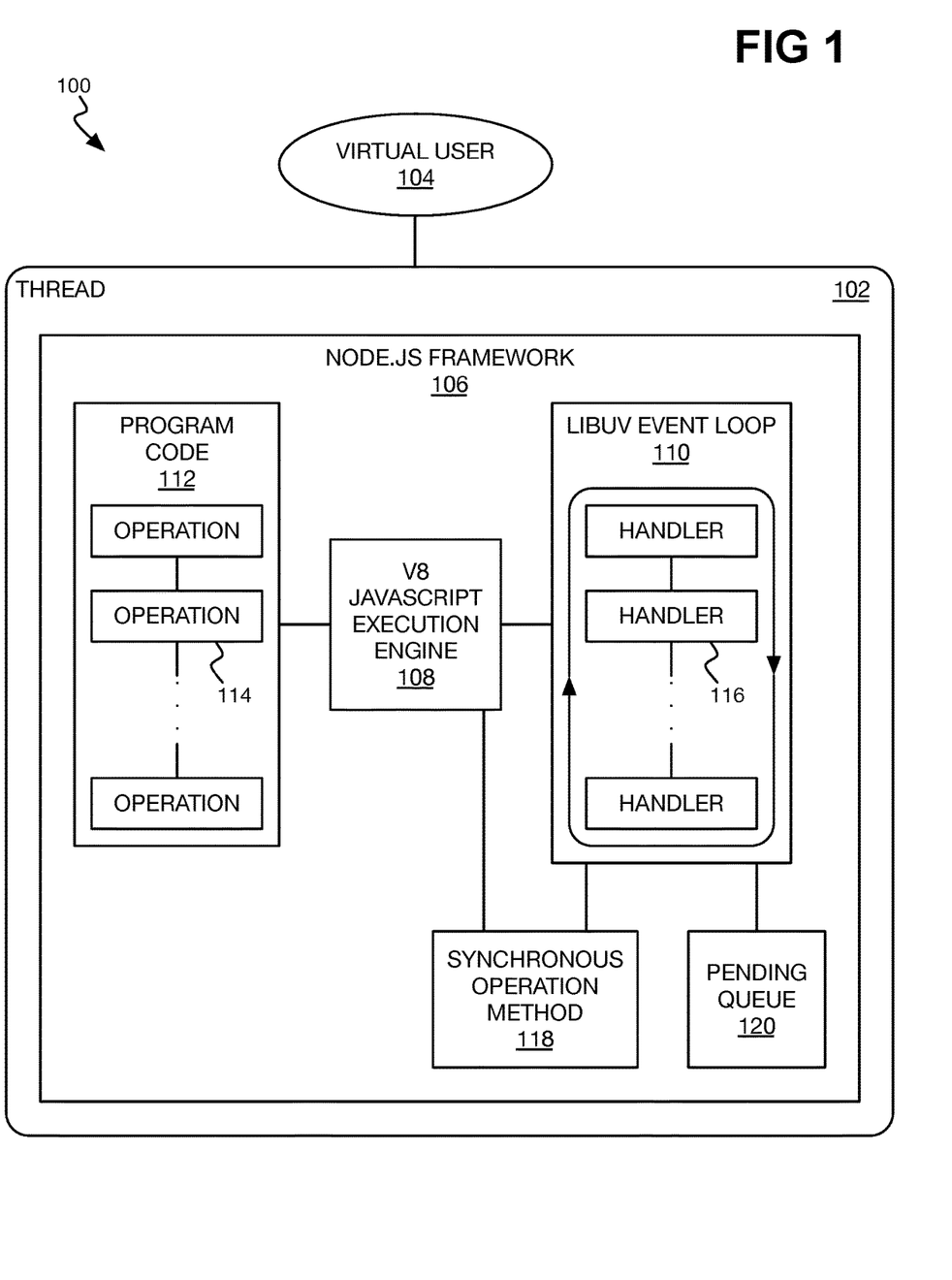
FIG. 1 is a diagram of an example framework architecture providing for synchronous execution of a synchronous operation method in the context of an asynchronous event loop.

FIG. 1 shows an example framework architecture 100. A framework 106 executes within a single thread 102 that can be associated with a single virtual user 104. The virtual user 104 can be a software object simulating a real user. Association of the single thread 102 with the virtual user 104 isolates the single thread 102, and its framework 106, from other threads that may contain their own frameworks. A thread 102 is a sequence of programmed instructions, and there may be multiple such threads for a process, which is an instance of a current program. The framework 106 can be a Node.js framework, which is a runtime environment providing for server-side execution of JavaScript code, primarily in an asynchronous manner.

The framework 106 includes an execution engine 108, an event loop 110, and program code 112. The execution engine 108 can be a V8 JavaScript execution engine, such that the program code 112 can be JavaScript program code. The event loop 110 may be a libuv library event loop. The program code 112 includes a sequence of operations 114. The execution engine 108 can initiate execution of the operations 114 in order. Upon executing an operation 114 that calls a method, for instance, the execution engine 108 adds an associated handler 116 to the event loop 110, and can then proceed to initiate execution of the next operation 114. When the method has been completed, it returns its processing results via calling the associated handler 116 added to the event loop 110, which triggers a callback function associated with the method. The event loop 110, in other words, listens for events and then triggers the callback function specified within the handler 116 for each event.

For example, an operation 114 within the program code 112 may specify a function or method to read a file. The execution engine 108 calls this method, which begins to read the file, and adds a handler 116 associated with the method to the event loop 110. The execution engine 108 then proceeds to execute the next operation 114 within the program code 112. Once the file has been read, the method returns the results of this operation by calling the handler 116 added to the event loop 110. Stated another way, an event is generated, which the event loop 110 detects and then executes the handler 116 associated with the method that resulted in generation of the event.

The event loop 110 therefore is a mechanism by which the framework 106 provides for asynchronous execution of the operations 114 of the program code 112 by the execution engine 108, because the event loop 110 listens for events and calls the callback functions, or handlers 116, for the events that the loop 110 encounters. The event loop 110 is a loop in that it constantly loops, listening for events for the handlers 116 that have been previously added to the loop 110. The execution engine 108 does not have to block execution of an operation 114 waiting for it to be completed, before initiating execution of the next operation 114.

However, the framework architecture 100 also provides for synchronous performance of an operation method, within the framework 106 that generally provides for asynchronous execution via the (asynchronous) event loop 110. This is achieved as follows. The execution engine 108 encounters an operation 114 while executing the program code 112 that calls a synchronous operation method 118, meaning that the method 118 is to be performed synchronously. As such, until execution of the method 118 has been completed, subsequent operations 114 are not to have their execution initiated. The operation 114 calling the synchronous operation method 118 is thus a blocking operation.

The execution engine 108 can be blocked from executing subsequent operations 114 within the program code 112 via the synchronous operation method 118 not immediately returning control to the program code 112 that the execution engine 108 is executing. As such, the execution engine 108 does not execute subsequent operations 114 within the program code 112. However, events may still continue to be fired that result in callbacks to the handlers 116 within the event loop 110. Therefore, to ensure that no execution occurs resulting from such event calls to the handlers 116 while the method 118 is running, the method 118 can (temporarily) control the event loop 110.

Once the synchronous operation method 118 takes control of the event loop 110, the method 118 can temporarily disable the asynchronous nature of the event loop 110 until execution of the method 118 has been completed. Specifically, the method 118 can disable the handlers 116 within the event loop 110, except the handler 116 that the method 118 itself calls to signal its own completion. Therefore, synchronous execution of the operation method 118 is ensured, because asynchronous event calls to the handlers 116 within the event loop 110 are themselves not processed since the handlers 116 are disabled.

However, while the asynchronous event calls, which may be callbacks, to the handlers 116 are disabled, they are not completely dropped. Rather, as the events are generated, they are placed within a pending queue 120. That is, the event loop 110 continues to iteratively loop, listening for events. When the event loop 110 receives an event—other than a callback event issued by the synchronous operation method 110 calling its own handler 118—the loop 110 places the event in the pending queue 120 instead of passing the event to the handler 116 with which it is associated. The handlers 116 (other than the handler 116 associated with the synchronous operation method 110 itself) are temporarily disabled, and therefore cannot process such events.

When the synchronous operation method 118 has been completed, it calls its own handler 118 within the event loop 110. Because the handler 116 associated with the method 118 itself has not been suspended, the execution engine 108 executes the handler 116 in the context of the event loop 110, and the other handlers 116 of the loop 110 are reenabled. Blocking of the executing engine 108 stops when the method 118 has finished executing, resulting in the engine 108 continuing to parse or execute the next operation 114 within the program code 112. Once the operations 114 within the program code 112 have finished executing, the events and event callbacks that are in the pending queue 120 are fired in the order in which they have been placed in the queue 120, and can be handled within the event loop 110 since their handlers 116 were previously reenabled.

In this way, then, the asynchronous framework 106 may synchronously execute the method 118 when the synchronous operation method 118 is encountered by the execution engine 108 when executing the operations 114 of the program code 112. Normally, for asynchronous execution, the execution engine 108 may initiate a call to a method specified by an operation 114 within the program code 112, causing an event handler 116 to be added to the event loop 110, before the engine 108 proceeds to the next operation 114 within the code 112. When the program code 112 has finished executing, the event handler 116 within the event loop 110 and associated with the method is called.

By comparison, for synchronous execution of the synchronous operation method 118, the execution engine 108 initiates a call to the method 118, as specified by an operation 114 within the program code 112. The synchronous operation method 118 does not return control immediately back to the execution engine 108, which blocks the engine 108 from executing the next operation 114 within the program code 112. The method 118 takes over control of the event loop 110, disabling the handlers 116 within the loop 110, except for the handler 116 for the method 118 itself that the method 118 added to the event loop 110. When the method 118 is finished, it calls back the handler 116, reenabling the handlers 116 within the event loop 110 and thus relinquishing control of the loop 110. The execution engine 108 can continue execution of the next operation 114 within the program code 112. Any event callbacks that fired and that were placed in the pending queue 120 by the framework 106 while the handlers 116 were disabled can be processed by their associated handlers 116 once the program code 112 has finished.

Figure 2:
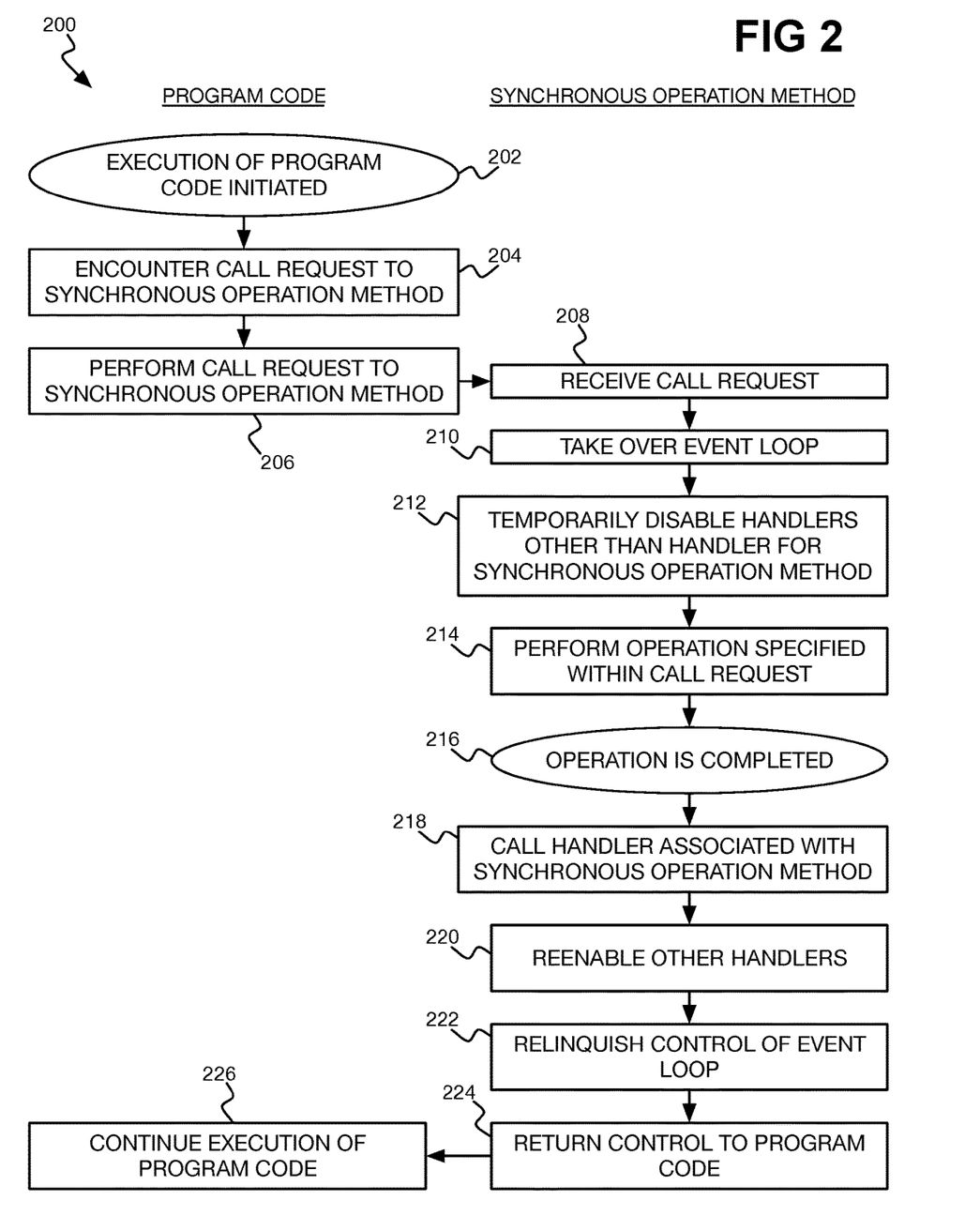
FIG. 2 is a flowchart of an example method for synchronous execution of a synchronous operation method in the context of an asynchronous event loop.

FIG. 2 shows an example method 200 for performing synchronous execution of a synchronous operation within the context of an asynchronous event loop. The method 200 can be implemented as a non-transitory computer-readable data storage medium storing instructions that a processor executes. The method 200 is described in relation to the example framework architecture 100 for descriptive clarity, but is applicable to other types of architectures as well.

The method 200 is divided into two columns. The left column is associated with the program code 112 and its operations 114, whereas the right column is associated with the synchronous operation method 118. In this respect, it is noted that the execution engine 108 is that which actually executes the program code 112, and which can also execute the synchronous operation method 118.

The event loop 110, which is also executed by the engine 108, does not have its own column in the method 200. Rather, a method that the event loop 110 performs is described later in the detailed description. That is, the event loop 110 executes or runs concurrently—i.e., asynchronously—with the execution of the program code 112 and/or the synchronous operation method 118.

Execution of the program code 112 is initiated (202). For example, the virtual user 104 of FIG. 1 may be instantiated, and a new thread 102 associated with the virtual user 104 created. The framework for program code execution can then be initialized, which results in initialization of the execution engine 108 so that the engine 108 can begin executing the program code 112. Furthermore, a network connection may be opened for the program code 112 to use at this time. The event loop 110 may also be started within the framework 106, to asynchronously handle fired events by the program code 112 or by callback events resulting from methods that the code 112 has called.

While being executed by the execution engine 108, the program code 112 encounters a call request to the synchronous operation method 118 (204), within one of the operations 114 of the program code 112. As such, the program code 112 performs the call request (206), such that the execution engine 108 calls the synchronous operation method 118. The synchronous operation method 118 correspondingly receives the call request from the program code 112 (208).

The synchronous operation method 118 temporarily takes over the event loop 110 (210). For example, the event loop 110 may when first started be managed under the direct auspices of the framework 106 itself, as opposed to being subsidiary to any method, like the method 118, executing within the framework 106. The synchronous operation method 118 takes over control of the event loop 110 so that the method 118 can temporarily disable the handlers 116 within the event loop 110 (212), other than the callback handler 116 for the synchronous operation method 110 itself, which is added to the event loop 110 when the synchronous operation method 118 is called.

The synchronous operation method 118 executes within the same thread 102 within which the event loop 110 is executing, rather than executing within a new thread and blocking the thread 102 to temporarily pause the event loop 110. Synchronous operation of the method 118 can still be achieved, because the method 118 has taken over the event loop 110, and has temporarily disabled the handlers 116 other than its own handler 116. As such, computing device resources are conserved; i.e., their usage is optimized.

The synchronous operation method 118 then performs the operation specified within the call request (214). For example, the method 118 may be a networking operation that performs networking input/output (I/O). Such a network I/O operation can use the network connection that was previously opened when execution of the program code 112 was initiated. Usage of this already established network connection by the synchronous operation method 118, rather than opening a new network connection, also conserves resources such that their usage is optimized.

Once the synchronous operation method 118 has completed the operation (216), the method 118 calls the handler 116 associated therewith (218) within the event loop 110. The synchronous operation method 118 may return any results that were requested in the call request. For example, completion of the operation may for a network I/O operation may entail completion of the I/O. The results for such a request that is a write or transmit request can be an indication that the write or transmit operation succeeded (or failed). The results for such a request that is read or receive request can be the data that has been read or received.

The other handlers 116 are also reenabled (220), control of the event loop 110 relinquished back to the framework 106 as a whole (222), and control returned to the program code 112 (224), such that program code continues being executed (226) by the execution engine 108. The re-enablement of the other handlers 116 results in any events received while the synchronous operation method 118 was performing the operation specified requested within the call request being handled, as is described in more detail later in the detailed description. Control of the event loop 110 is relinquished since execution of the synchronous operation method 118 has finished. Return of control back to the program code 112 is effectively achieved via the synchronous operation method 118 calling its associated handler 116 within the event loop 110.

The method 200 thus achieves synchronous execution of the synchronous operation method 118 as follows. The synchronous operation method 118 does not return control back to the program code 222 that called the method 118 until the method 118 has completed. Therefore, the execution engine 108 is effectively blocked from performing subsequent operations 114 within the program code 112. By comparison, asynchronous operation methods return control back to the program code 222 once they have begun being executed. By not returning control to the program code 112 until the synchronous operation method 118 has completed, synchronous execution of the method 118 is ensured with respect to preventing subsequent operations 114 within the program code 112 from being executed by the execution engine 108.

However, even while the synchronous operation method 118 is executing, the event loop 110 still concurrently (i.e., asynchronously) runs. This means that any fired events, including callback events resulting from other methods that had their execution initiated via previous operations 114 within the program code 112, may still interrupt the synchronous nature of the execution of the method 118. To prevent this from occurring, the synchronous operation method 118 thus temporarily takes over the event loop 110 so that the method 118 can temporarily disable the handlers 116 other than its own handler 116. Therefore, the event loop 110 still runs, and events still are fired, but since the handlers 116 that are responsible for handling the events within the event loop 110 have been disabled, the events cannot interrupt the synchronous execution of the method 118.

Figure 3:
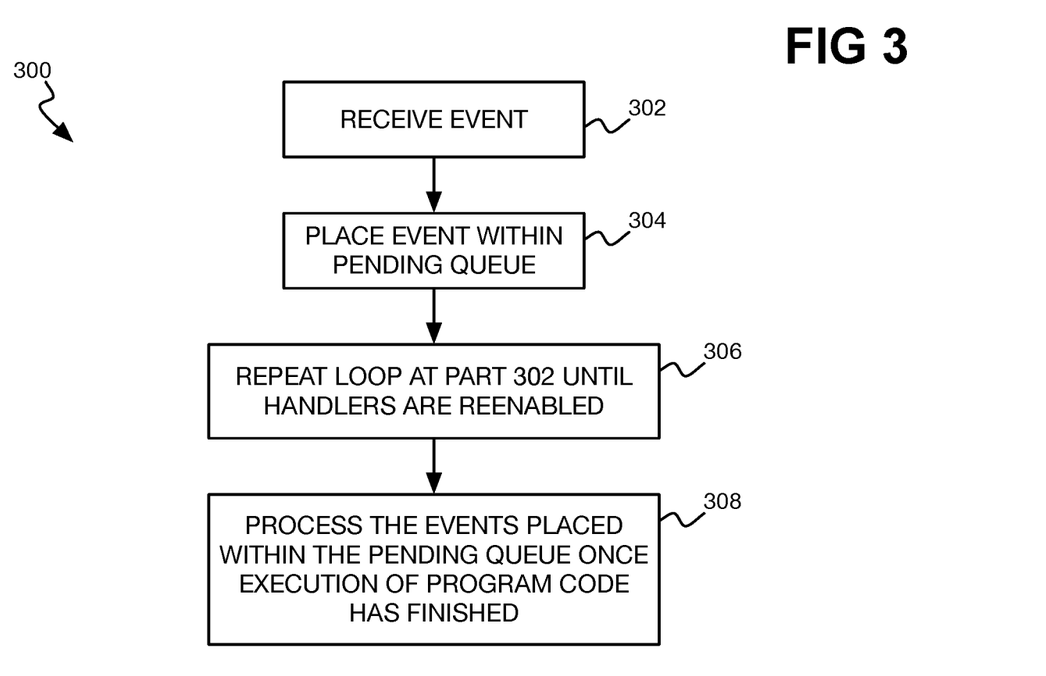
FIG. 3 is a flowchart of an example method for handling asynchronous events during and after synchronous execution of a synchronous operation in the context of an asynchronous event loop.

FIG. 3 shows an example method 300 for handling asynchronous events during and after synchronous execution of a synchronous operation within the context of an asynchronous event loop. Like the method 200, the method 300 can be implemented as a non-transitory computer-readable data storage medium storing instructions that a processor executes. The method 300 is also described in relation to the example framework architecture 100 for descriptive clarity, but is applicable to other types of architectures as well.

The event loop 110, as can be executed by the execution engine 108, performs the method 300. The event loop 110 performs the method 300 after the synchronous operation method 118 has taken over the event loop 110 in part 210 of the method 200 and has disabled the handlers 116 of the event loop 110 other than its own. Specifically, the event loop 110 performs parts 302, 304, and 306 of the method 300 until the synchronous operation method 118 has reenabled the previously disabled handlers 116 in part 220 of the method 200. As such, the event loop 110 may perform the method 300 while under the control of the synchronous operation method 118.

The event loop 110 receives a fired event (302), which may be an asynchronous event call or callback with which one of the handlers 116 is associated. The event loop 110 cannot pass the event call or callback to the associated handler 116, because it has been disabled by the synchronous operation method 118. Therefore, the fired event is placed within the pending queue 120 (304), as opposed to being dropped.

The event loop 110 is repeated at part 302 (306), such that events are placed in the pending queue 120 as they are received, until the handlers 116 have been reenabled by the synchronous operation method 118. Thereafter, once the program code has finished execution, the event loop 110 can process the events placed within the pending queue 120 (308). The events may be processed in a first-in, first-out (FIFO) basis. Processing an event includes calling the handler 116 with which the event is associated.

The techniques that have been described herein thus provide for synchronous performance of a synchronous operation method in the context of an asynchronous event loop of a singled-threaded framework. The synchronous nature of the method itself ensures that an execution engine will not execute subsequent operations within program code until the synchronous operation method has been completed. The method taking over control of the event loop and disabling handlers other than its own ensures that events that fire while the synchronous operation method is executing are not asynchronously handled.

The techniques that have been described herein can further conserve computing resources (i.e., such that their usage is optimized) while providing for the synchronous performance of a synchronous operation method. The synchronous operation method runs within the single thread of the framework itself and that is associated with a virtual user, instead of being run in a separately spawned thread. In this respect, the single-threaded nature of the framework is also preserved. For an operation method that is an I/O method, like a network I/O method, a connection that was opened at initial execution of the program code can be used since the method runs within the same thread as the program code, instead of opening a new connection.

Figure 4:
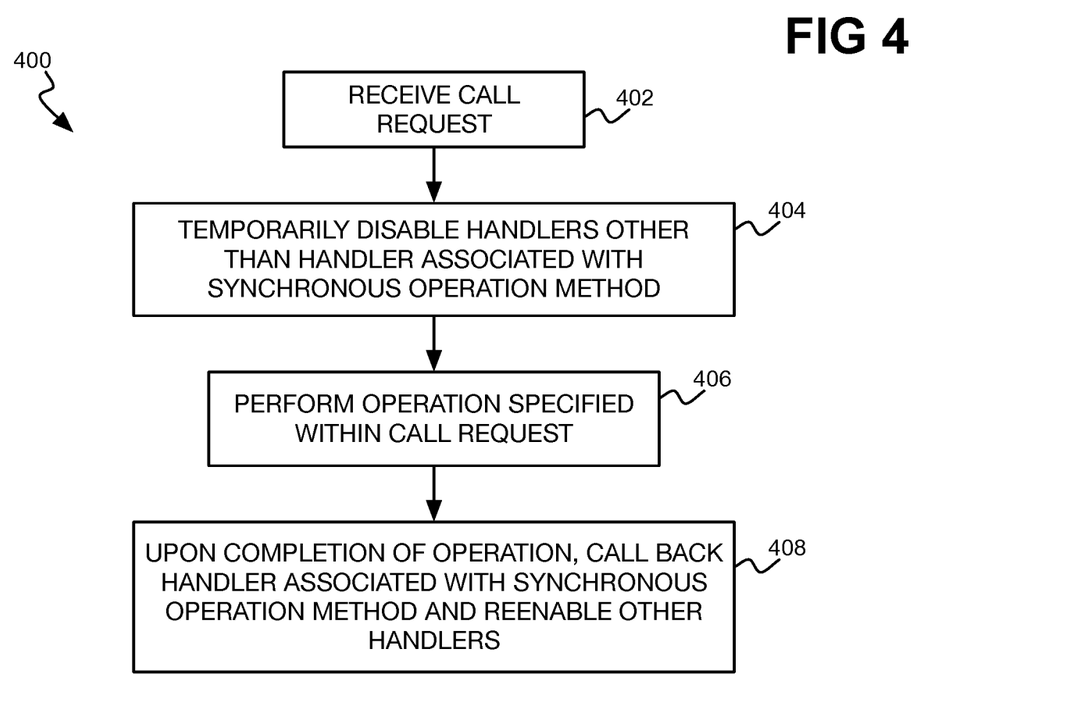
FIG. 4 is a flowchart of another example method for synchronous execution of a synchronous operation method in the context of an asynchronous event loop.

FIG. 4 shows an example method 400. A synchronous operation method receives a call request from program code executing on an execution engine running on a computing device (402). The program code has an associated event loop that handles asynchronous event calls and callbacks within the program code. The synchronous operation method temporarily disables handlers of the event loop associated with these asynchronous event calls and callbacks, except for a handler of the event loop associated with the operation method itself (404).

The synchronous operation method then performs an operation specified within the call request, while the event loop is running with the handlers disabled (406), except the handler associated with the synchronous operation method, which remains enabled. Upon completion of the operation, the synchronous operation method calls back its associated handler, and re-enables the other handlers (408). When calling back the handler associated with the synchronous operation method, the operation method can include the results of the performance of the specified operation.

Figure 5:
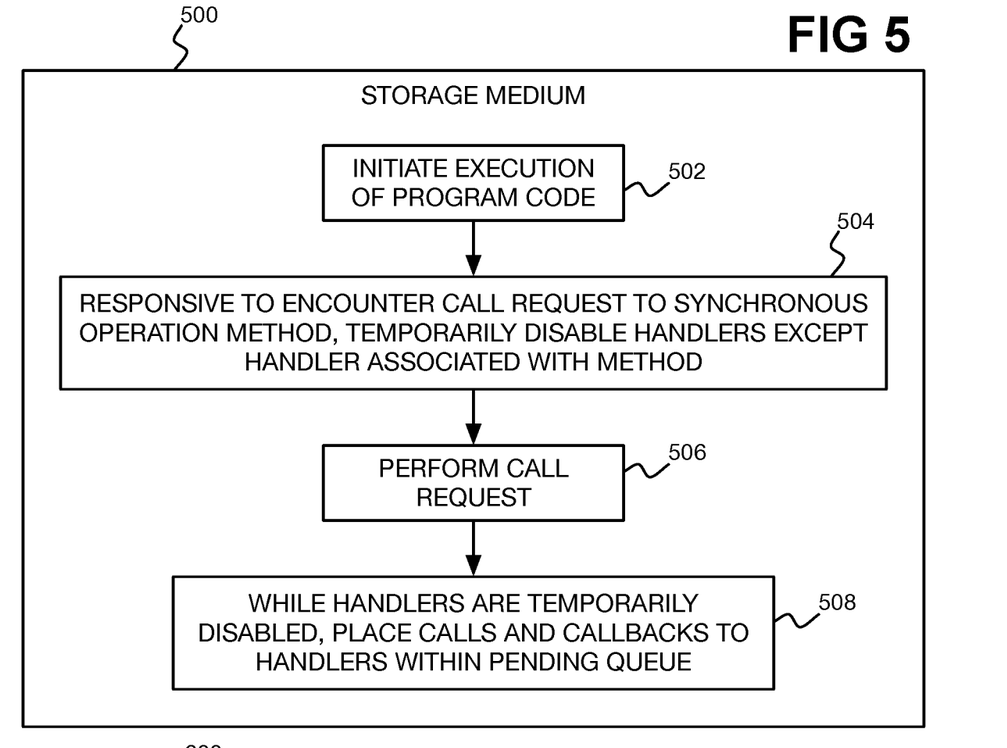
FIG. 5 is a diagram of an example non-transitory computer-readable data storage medium for synchronous execution of a synchronous operation method in the context of an asynchronous event loop.

FIG. 5 shows an example storage medium 500. The storage medium 500 can embody or store instructions or program code that when executed by a processor causes the following to be performed. Execution of program code is initiated via a code engine (502). The execution of the program code is performed in relation to an event loop associated with the program code and providing for asynchronous operations of the program code.

Responsive to encountering a call request to a synchronous operation method within the program code (504), handlers of the event loop that provide for the asynchronous operations of the program code are temporarily disabled, except for an event handler associated with the synchronous operation method. The call request to the synchronous operation is performed (506). The synchronous operation method executes while the event handlers remain temporarily disabled. While the event handlers remain temporarily disabled, event calls and callbacks to the handlers are placed within a pending queue (508).

Figure 6:
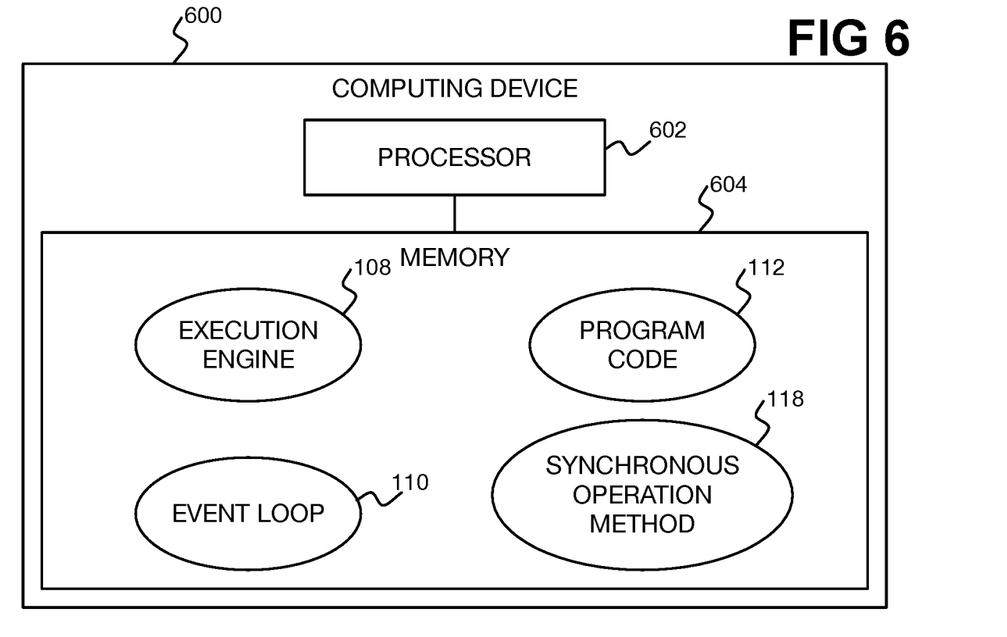
FIG. 6 is a diagram of an example system for synchronous execution of a synchronous operation method in the context of an asynchronous event loop.

FIG. 6 shows an example computing device 600. The computing device 600 may be a computing system, or may be part of a computing system. The computing device 600 includes a processor 602 and a memory 604 that embodies or stores instructions or program code that the processor 602 executes to realize the execution engine 108, the event loop 110, the program code 112, and the synchronous operation method 118.

We claim:
1. A method comprising:
receiving, by a synchronous operation method from program code executing within an asynchronous program code execution environment on an execution engine running on a computing device, a call request, the program code having an associated event loop handling asynchronous event calls and callbacks within the program code;
temporarily disabling, by the synchronous operation method, a plurality of handlers of the event loop associated with the asynchronous event calls and the callbacks within the program code, except a handler of the event loop associated with the synchronous operation method;
performing, by the synchronous operation method, an operation specified within the call request received from the program code, while the event loop is running with the handlers associated with the asynchronous event calls and the callbacks, except the handler associated with the synchronous operation method, being temporarily disabled; and
upon completion of the operation, calling back, by the synchronous operation method, the handler of the event loop associated with the synchronous operation method, with results of performance of the operation, and reenabling the handlers associated with the asynchronous event calls and the callbacks within the program code; and while the synchronous operation method is performing the operation and the event loop is running with the handlers associated with the asynchronous event calls and the callbacks, except the handler associated with the synchronization operation method, being temporarily disabled:
  receiving the asynchronous event calls and the callbacks with which the handlers are associated; and
  placing the received asynchronous event calls and the received callbacks within a pending queue, the handlers remaining temporarily disabled and unable to process the received asynchronous event calls and the received callbacks.

2. The method of claim 1, wherein the execution engine runs on the computing device as a single thread within which the event loop is run.

3. The method of claim 2, wherein the synchronous operation method runs within the single thread, conserving usage of resources of the computing device in synchronous execution of the operation relative to having the synchronous operation method run in a different thread.

4. The method of claim 2, wherein the single thread is associated with a single virtual user.

5. The method of claim 4, wherein association of the single thread with the single virtual user isolates the event loop running within the single thread from other event loops of other virtual users.

6. The method of claim 1, wherein temporarily disabling of the handlers of the event loop ensures synchronous performance of the operation specified within the call request relative to the program code.

7. The method of claim 1, wherein the operation specified within the call request is a network operation,
  wherein at beginning execution of the program code a network connection is established for the program code,
  wherein the synchronous operation method uses the established network connection to perform the operation specified within the call request.

8. The method of claim 7, wherein usage of the established network connection by the synchronous operation method to perform the operation specified within the call request conserves usage of resources of the computing device in synchronous execution of the operation relative to having the synchronous operation method use a different network connection.

9. The method of claim 1, further comprising, upon reenabling of the handlers associated with the asynchronous event calls and the callbacks:
  processing, by the reenabled handlers, the received asynchronous event calls and the received callbacks previously placed within the pending queue.

10. The method of claim 1, wherein while the synchronous operation method is performing the operation, the execution engine continues to execute the program code by passing the asynchronous event calls to the event loop, but the handlers associated with the asynchronous event calls, having been temporarily disabled, block processing of the asynchronous event calls within the event loop, ensuring synchronous performance of the operation specified within the call request relative to the program code.

11. The method of claim 1, wherein the program code is JavaScript program code, the execution engine is a JavaScript code engine, and the event loop is a libuv library event loop,
  and wherein the program code, the execution engine, and the event loop are part of a Node.js framework.

12. A non-transitory computer-readable data storage medium storing instructions executable by a processor to:
  initiate execution of program code via an execution engine, the execution of the program code performed in relation to an event loop associated with the program code and providing for asynchronous operations of the program code within an asynchronous program code execution environment;
  responsive to encountering a call request to a synchronous operation method within the program code, temporarily disable a plurality of handlers of the event loop that provide for the asynchronous operations of the program code, except for an event handler associated with the synchronous operation method;
  after the handlers that provide for the asynchronous operations have been disabled, except for the handler associated with the synchronous operation method, perform the call request to the synchronous operation method, the synchronous operation method executing while the event handlers remain temporarily disabled;
  while the event handlers remain temporarily disabled, placing event calls and callbacks to the temporarily disabled handlers within a pending queue until the synchronous operation method has completed executing; and
  responsive to a callback to the event handler associated with the synchronous operation method, signifying completion of the synchronous operation method, reenabling the temporarily disabled handlers and passing the event calls and the callbacks placed within the queue to the reenabled handlers for processing.

13. The non-transitory computer-readable data storage medium of claim 12, wherein the execution engine runs as a single thread within which the event loop is run, conserving usage of resources of the computing device in synchronous execution of an operation specified within the call request, relative to having the synchronous operation method run in a different thread,
  and wherein the single thread is associated with a single virtual user, isolating the event loop running within the single thread from other event loops of other virtual users.

14. The non-transitory computer-readable data storage medium of claim 12, wherein the synchronous operation method is a synchronous network operation method,
  wherein at initiation of execution of the program code a network connection is established for the program code,
  and wherein the synchronous network operation method uses the established network connection, conserving usage of resources of the computing device in performance of the synchronous operation method.

15. A system comprising:
  a processor; and
  a memory storing instructions executable by the processor to:
    encounter a call request to a synchronous operation method within program code executing within an asynchronous program code execution environment;
    in response to encountering the call request, temporarily disable a plurality of handlers of an event loop that provide for asynchronous operations of the program code, except for an event handler associated with the synchronous operation method; and
    after encountering the call request to the synchronous operation method within the program code, place event calls and callbacks to the temporarily disabled plurality of handlers within a pending queue, wherein temporary disablement of the plurality of handlers ensures synchronous performance of the synchronous operation method relative to the program code.

16. The system of claim 15, wherein the instructions are executable by the processor to further:

upon completion of the synchronous operation method, reenable the temporarily disabled plurality of handlers to process the event calls and the callbacks placed within the queue.

17. The system of claim 15, wherein the program code is executed on an execution engine running as a single thread within which the event loop is run, conserving usage of resources of the computing device in synchronous execution of an operation specified within the call request, relative to having the synchronous operation method run in a different thread, and wherein the single thread is associated with a single virtual user, isolating the event loop running within the single thread from other event loops of other virtual users.

* * * * *